US012312834B2

(12) United States Patent
Dragon et al.

(10) Patent No.: US 12,312,834 B2
(45) Date of Patent: May 27, 2025

(54) MOTOR VEHICLE, IN PARTICULAR MOTOR VEHICLE DOOR LOCK

(71) Applicant: Kiekert AG, Heiligenhaus (DE)

(72) Inventors: Marek Dragon, Waldbröl (DE); Alexander Grossmann, Essen (DE)

(73) Assignee: Kiekert AG, Heiligenhaus (DE)

( * ) Notice: Subject to any disclaimer, the term of this patent is extended or adjusted under 35 U.S.C. 154(b) by 332 days.

(21) Appl. No.: 17/782,184

(22) PCT Filed: Nov. 23, 2020

(86) PCT No.: PCT/DE2020/100990
§ 371 (c)(1),
(2) Date: Jun. 3, 2022

(87) PCT Pub. No.: WO2021/110206
PCT Pub. Date: Jun. 10, 2021

(65) Prior Publication Data

US 2023/0045645 A1 Feb. 9, 2023

(30) Foreign Application Priority Data

Dec. 6, 2019 (DE) ..................... 10 2019 133 324.5

(51) Int. Cl.
*E05B 15/00* (2006.01)
*E05B 15/04* (2006.01)
(Continued)

(52) U.S. Cl.
CPC .......... *E05B 15/0053* (2013.01); *E05B 15/04* (2013.01); *E05B 77/26* (2013.01);
(Continued)

(58) Field of Classification Search
CPC ...... E05B 15/0053; E05B 15/04; E05B 77/26; E05B 77/283; E05B 77/28; E05B 81/90; E05B 2015/0468; E05B 2015/0066
See application file for complete search history.

(56) References Cited

U.S. PATENT DOCUMENTS 10,472,868 B2 * 11/2019 Nozawa .................. E05B 81/16
2005/0077733 A1 4/2005 Fisher et al.

FOREIGN PATENT DOCUMENTS

DE 3902776 A1 2/1990
DE 19702420 A1 7/1998
(Continued)

OTHER PUBLICATIONS

International Search Report mailed Feb. 24, 2021, for priority International Patent Application No. PCT/DE2020/100990.

*Primary Examiner* — Teri P Luu
*Assistant Examiner* — Yahya Sidky
(74) *Attorney, Agent, or Firm* — Renner, Otto, Boisselle & Sklar, LLP

(57) ABSTRACT

The invention relates to a motor vehicle lock, in particular a motor vehicle door lock, which is equipped with a locking mechanism (1, 2) composed, essentially, of a rotary latch (1) and a pawl (2). Furthermore, a securing device (5, 6, 7, 8) and and an emergency actuation element (9, 10, 11) for the securing device are realized. The securing device (5, 6, 7, 8) has at least one securing lever (5), which can be acted upon both by a first motor drive (7) and by an emergency actuation lever (10) as part of the emergency actuation element (9, 10, 11). According to the invention, the first securing lever (5) has a spring (5*a*) for positioning the first securing lever.

16 Claims, 3 Drawing Sheets

(51) Int. Cl.
*E05B 77/26* (2014.01)
*E05B 77/28* (2014.01)
*E05B 81/90* (2014.01)

(52) U.S. Cl.
CPC ............ *E05B 77/283* (2013.01); *E05B 81/90* (2013.01); *E05B 2015/0468* (2013.01)

(56) References Cited

FOREIGN PATENT DOCUMENTS

| | | | | |
|---|---|---|---|---|
| DE | 19756266 | A1 | 6/1999 | |
| DE | 19814003 | C1 | 8/1999 | |
| DE | 29913464 | U1 | 12/1999 | |
| DE | 19934877 | A1 | 2/2000 | |
| DE | 102005052190 | A1 | 5/2007 | |
| DE | 102014108936 | A1 | 12/2014 | |
| DE | 102014114347 | A1 | 4/2016 | |
| EP | 2913463 | A1 | 9/2015 | |
| EP | 2112306 | B1 | 10/2017 | |
| GB | 2335946 | A * | 10/1999 | ............ E05B 77/28 |
| GB | 2458574 | A | 9/2009 | |
| WO | 2013170363 | A1 | 11/2013 | |
| WO | 2017050320 | A1 | 3/2017 | |

* cited by examiner

MOTOR VEHICLE, IN PARTICULAR MOTOR VEHICLE DOOR LOCK

This application is a national phase of International Application No. PCT/DE2020/100990 filed Nov. 23, 2020, which claims priority to German Application No. 10 2019 133 324.5 filed Dec. 6, 2019, each of which is hereby incorporated herein by reference in its entirety.

FIELD OF DISCLOSURE

The invention relates to a motor vehicle lock, in particular a motor vehicle door lock, having a locking mechanism composed substantially of a rotary latch and a pawl, and having a securing device, for example a central locking device and/or an anti-theft device and/or a child safety device, and having an emergency actuation element for the securing device, wherein the securing device has at least one first securing lever which can be acted upon both by a first motor drive and by an emergency actuation lever as part of the emergency actuation element.

BACKGROUND OF DISCLOSURE

The motor vehicle lock is typically a motor vehicle door lock—that is, a motor vehicle lock which is attached to or in a motor vehicle door, a motor vehicle hatch, a motor vehicle tailgate, a motor vehicle front hood etc. In addition, within the scope of the invention, the term motor vehicle lock also includes locks in or on motor vehicles, for example in conjunction with a seat lock, a tank door lock, etc. However, it is typically a motor vehicle door lock.

Such motor vehicle door locks generally have a securing device. The securing device can be a central locking device, by means of which all motor vehicle door locks of an associated motor vehicle are locked in such a way that actuation from the outside is not possible, but the associated motor vehicle door can still be opened from the inside. On the other hand, an anti-theft device ensures that, in the "ON" position, neither internal nor external operation is permitted. In the case of a child safety device, on the other hand, only the rear side doors of the motor vehicle are locked from the inside—so they cannot be opened from the inside. However, opening from the outside is still possible.

The securing device has the first securing lever, which as a rule is acted upon by the motor drive and/or a first motor drive. As a result, the securing device can typically be switched into its two functional positions, "ON" or "OFF." This can be done, for example, using a remote control to activate the motor drive. So that the associated motor vehicle door can still be opened, to allow access if the securing device fails, the emergency actuation element is provided.

With the help of the emergency actuation element, the securing device can be manually transferred at least from its "OFF" position to the "ON" position. In this case, the emergency actuation element is an emergency opening element. In principle, however, the emergency actuation element can also ensure that the securing device is engaged—that is to say, it is transferred from its "OFF" position to the "ON" position. Then the emergency actuation element is designed as an emergency locking element.

In the generic prior art according to EP 2 913 463 B1 and/or according to EP 2 112 306 B1, a first locking element and a second locking element are implemented, and can each be acted upon by means of their own dedicated motor drives, namely a first motor drive and a second motor drive. In addition, a manually operable locking button is also implemented, and mainly takes over or can take over the function of the emergency actuation element.

In the further prior art according to WO 2017/050320 A1, the procedure is comparable. This disclosure concerns an actuating device which is equipped with an anti-theft device, a central locking device, a child safety device, and an actuating device for opening the locking mechanism. The anti-theft device comprises an anti-theft lever that can be pivoted via its own electric drive. The central locking system is equipped with an additional central locking lever that has its own electric drive. In order to provide a compact structure, the anti-theft lever and the central locking lever are rotatably mounted on the same axis. This is a proven approach.

Two drive motors are also implemented in the motor vehicle door lock according to DE 10 2005 052 190 A1—specifically, a locking motor on the one hand and an anti-theft or child safety motor on the other. The locking motor works on a central locking lever, whereas the anti-theft/child safety motor acts on a locking lever. As in the case described above, the central locking lever and the locking lever are pivotably mounted about the same axis.

The locking device according to DE 197 56 266 A1 also makes use of two electric motors for associated worm gears. The two worm gears are again mounted on the same axis.

With regard to an emergency actuation element or the design of a child safety lever, DE 10 2014 114 347 A1 should also be mentioned. In this case, the child safety lever is acted upon by a spring, the child safety lever and the spring being designed as a structural unit. As a result, the design effort involved in realizing the child safety device can be reduced compared to previous embodiments.

The prior art has basically proven itself when it comes to combining two or more securing devices, and at the same time providing a compact structure. In fact, DE 10 2005 052 190 A1 and WO 2017/050320 A1 in particular consistently teach an arrangement in which a first securing lever and a second securing lever can be pivoted on a common axis. In the context of the aforementioned PCT application, this is, for example, an anti-theft lever and a central locking lever. However, in this context there are no structurally simple and reliably functioning solutions for an additional emergency actuation element. This is because this emergency actuation element must ultimately accommodate the coaxial arrangement of the two securing levers, and still ensure proper manual actuation. The invention as a whole seeks to remedy this.

SUMMARY OF DISCLOSURE

The invention is based on the technical problem of further developing such a motor vehicle lock, and in particular a motor vehicle door lock, in such a way that a simple and functionally correct emergency actuation is provided.

To solve this problem, the invention proposes, for a generic motor vehicle lock, and in particular a motor vehicle door lock, that the first securing lever has a spring for positioning it.

In this context, the first securing lever on the one hand, and the spring on the other hand, can be designed separately, and can consist of different materials, for example. However, it has proven useful if the first securing lever and the spring are made of the same material, for example a plastics material. This allows the manufacturing and assembly costs to be significantly reduced. In addition, the design is usually such that the first securing lever has a guide groove for a housing pin. The housing pin is usually molded onto a lock housing as a component of the motor vehicle lock. Since the lock housing is typically made of a plastics material, the housing pin is also regularly made of a plastics material, and can easily be defined on the lock housing in question. As a result, favorable plastic/plastic friction conditions are provided between the housing pin on the one hand and the first securing lever on the other.

It has proven useful if the guide groove is formed with an enlarged cross section in the region of the end positions of the first securing lever. This enlargement of the cross section allows the securing lever to be positioned particularly sensitively and unambiguously. This is because the cross section enlargement in the region of the two end positions of the guide groove ensures that the housing pin extending through the guide groove is held in the given end position, and can only be moved out of the end position with a more or less pronounced force.

Such a defined positioning of the securing lever is of particular importance both for motor operation and for operation with the emergency actuation element. For example, the safe assumption of the functional position “anti-theft device ON” is of particular importance in order to ensure that the associated motor vehicle is also reliably secured against theft. Utilizing the spring assigned to the securing lever then supports both the previously mentioned position with the anti-theft device engaged, and the situation in which the anti-theft device is designed in the example—that is, the functional position “anti-theft device OFF.” This means that the system consisting of the housing pin and the spring of the guide groove, which has a larger cross section in the region of the end positions, ensures that the two end positions mentioned are assumed in a stable and reproducible manner. This is not only of particular importance for the motorized actuation of the securing lever.

In addition, a straightforward emergency actuation using the emergency actuation element requires that, in this case, an operator receives tactile feedback about the change from one end position to the other end position brought about by manually actuating the emergency actuation element. This is expressed in an initially increasing and then decreasing actuation force during an emergency actuation process, for example in the course of an emergency opening of the motor vehicle lock.

In order to be able to realize and implement this in detail, the guide groove is delimited in its longitudinal extension by a stop wall that is toward the inside radially with respect to an axis of rotation of the securing lever, and also by a spring wall that is toward the outside radially, as a spring. This means that the elongate guide groove has two longitudinal walls, namely the radially inner stop wall and the radially outer spring wall. In this case, the stop wall and the spring wall are generally each formed in an arc shape with respect to the axis of rotation for the securing lever.

In addition, the design is also advantageously selected in such a way that the spring wall, in the region of the two end positions of the securing lever, is designed with a material thickening with respect to a connection region between the two end positions. Due to this different material thickness or material strength of the spring wall, its spring effect is supported and/or fundamentally adjusted. The invention is based on the finding that the housing pin plunging into the guide groove can only slightly elastically deform the spring wall in the region of the end positions with the material thickening of the spring wall realized there. In contrast, the connection region of the spring wall that connects the two end positions to each other allows a greater elastic deformation in comparison, by means of the housing pin moving within the guide groove when the securing lever is moved. This greater deformation is achieved and provided in that the connection region has a lower material thickness of the spring wall compared to the two end positions.

As a result, the housing pin is automatically and obligatorily fixed in the region of the two end positions within the guide groove, because the spring wall of thicker material ensures a high clamping force in this region. In contrast, the connection region between the two end positions can be easily pushed aside, because the material thickness of the spring wall is lower there. In any case, this corresponds to an increasing actuating force of the pivoting movement of the securing lever when it leaves the end position. The spring force decreases in the connection region between the two end positions, such that the pin is transferred to the end position with the support of the spring.

The securing lever also has a limit stop for the emergency actuation lever and/or the emergency actuation element. Because the securing lever is generally made of a plastics material and is designed as a plastic injection molded part, the limit stop can easily be molded onto the securing lever. The limit stop generally interacts with a pin on the emergency actuation lever. In this case, the design is advantageously selected in such a way that the pin protrudes perpendicularly in relation to the elongated emergency actuation lever.

In this way, the pin can pass through an opening in a second securing lever mounted coaxially with the first securing lever. In other words, according to an advantageous embodiment, the securing device not only has the first securing lever, but usually also a second securing lever. The first securing lever may be designed as an anti-theft lever, whereas the second securing lever is or can be a central locking lever. Both securing levers are equipped with an associated motor drive, namely the first motor drive as an anti-theft drive and the second motor drive as a central locking drive.

Since the two securing levers, i.e., the anti-theft locking lever and the central locking lever, are generally mounted coaxially, i.e., on the same axis as each other, in the housing, emergency actuation of the anti-theft locking lever in this example requires that the pin on the emergency actuation lever passes through—and can pass through—the opening on the central locking lever, which is usually mounted above the anti-theft locking lever. This is the only way to ensure that the pin on the emergency actuation lever can interact with the limit stop on the first securing lever or anti-theft lever.

An actuating nut is generally provided, to act on the emergency actuation lever. The actuating nut is rotatably mounted in the lock housing. The actuating nut may have an actuating slot. In this way, an emergency actuation lever with a relatively long design can also be used via the actuating nut in order to be able to act effectively on the securing lever. This is ensured by the simple positioning of the securing lever, as a result of the interaction between the housing pin and the guide groove. In this case, the housing pin is advantageously elliptical or approximately elliptical in shape, such that it can also assume the function of a limit stop for the securing lever.

As a result, a motor vehicle lock is provided in which, first of all, a simple, motorized and manual movement of the securing lever is provided. For this purpose, the securing lever is equipped with a spring which, in conjunction with a housing pin engaging in a guide groove of the securing lever, ensures that the securing lever can assume two stable end positions corresponding to the “ON” and “OFF” functional positions of the securing device, correctly and reproducibly. This also applies when emergency actuation is required, taking into account a relatively large spatial distance between the securing lever on the one hand and the actuating nut on the other hand, by means of which actuating nut the emergency actuation lever, itself bridging a distance, is acted upon.

Utilizing a pin standing perpendicularly on the emergency actuation lever, to act on the securing lever, also ensures that two securing levers arranged coaxially with each other can advantageously be used in order to achieve a particularly compact design in this way. In fact, the actuating nut is usually designed as an external locking nut, so it at least ensures that an external locking can be released as a result. For this purpose, the external locking nut works via the actuation lever on the anti-theft lever, which in this case represents the first securing lever. In this case, the opening in the central locking lever, mounted coaxially thereto and arranged above the same, is what the pin passes through. The essential advantages can be seen in this configuration.

The invention is explained in greater detail below with reference to drawings, which show only one example of an embodiment. In the drawings:

DETAILED DESCRIPTION

Figure 1:
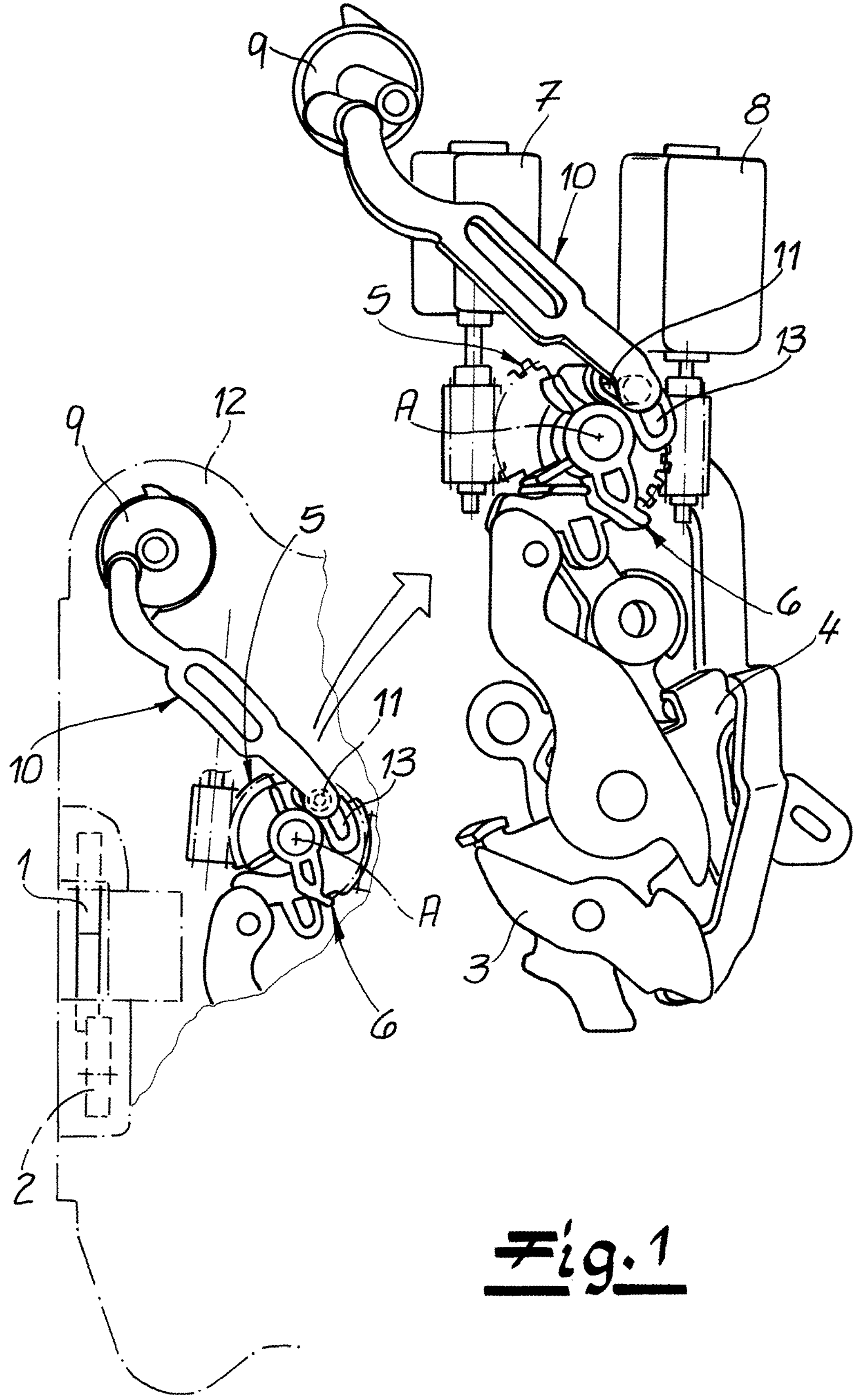
FIG. 1 shows the motor vehicle lock according to the invention in the form of a motor vehicle door lock, in a schematic overview.

FIG. 1 shows a motor vehicle lock which, according to the exemplary embodiment, is designed as a motor vehicle door lock, and may be implemented, for example, on a front or rear side door of an associated motor vehicle. The motor vehicle lock has a locking mechanism 1, 2 consisting substantially of a rotary latch 1 and pawl 2, which are arranged predominantly perpendicular to the plane of the drawing in the context of the illustration. An actuation lever linkage 3, 4 and a securing device 5, 6, 7, 8 are also important for the following descriptions. Finally, there is an emergency actuation element 9, 10, 11.

According to the exemplary embodiment, the securing device 5, 6, 7, 8 has at least one securing lever 5, 6. In fact, two securing levers 5, 6 are implemented according to the exemplary embodiment, namely a first securing lever 5 and a second securing lever 6. According to the exemplary embodiment, the first securing lever 5 is designed as an anti-theft securing lever 5, whereas the second securing lever 6 is a central locking lever 6. Both securing levers 5, 6 are, as shown in FIG. 1, mounted coaxially, i.e. on the same axis, about an axis of rotation A. In addition, the design is such that the central locking lever 6 is arranged above the anti-theft lever 5 when viewed from above.

The securing device 5, 6, 7, 8 then also includes at least one motor drive 7, 8. According to the exemplary embodiment, two motor drives 7, 8 are included. The first drive 7 works on the first securing lever 5, while the second drive 8 interacts with the second securing lever 6. The first motor drive 7 is an anti-theft drive, by means of which the first securing lever or anti-theft lever 5 can pivot about its axis or the axis of rotation A. In contrast, the second motor drive or central locking drive 8 ensures that the second securing lever 6 or central locking lever 6 is also subjected to pivoting movements about the shared axis and/or axis of rotation A.

In the following, the first securing lever or central locking lever 5 is primarily considered, as can be understood from FIGS. 2 and 3. The first motor drive or anti-theft drive 7, in the "anti-theft device ON" position, ensures that the locking mechanism 1, 2 cannot be opened either via an internal actuation lever 3 or an external actuation lever 4, which are essential components of the actuation lever linkage 3, 4. In contrast, the position "anti-theft device OFF" means that the locking mechanism 1, 2 can be opened both via the internal actuation lever 3 and the external actuation lever 4.

Figure 2:
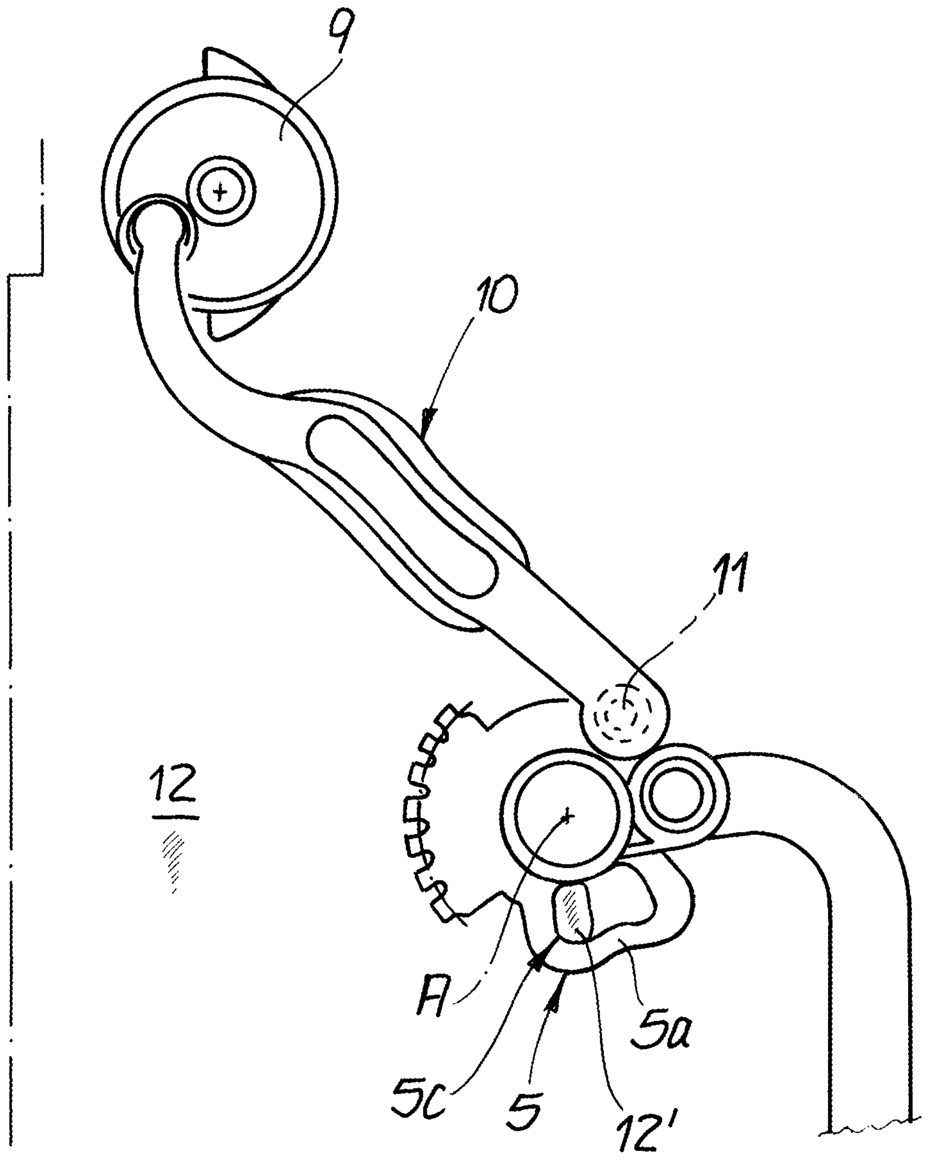
FIG. 2 shows the object according to FIG. 1 in the installed state in a housing, in a detailed view in the region of the securing device.
Figure 3:
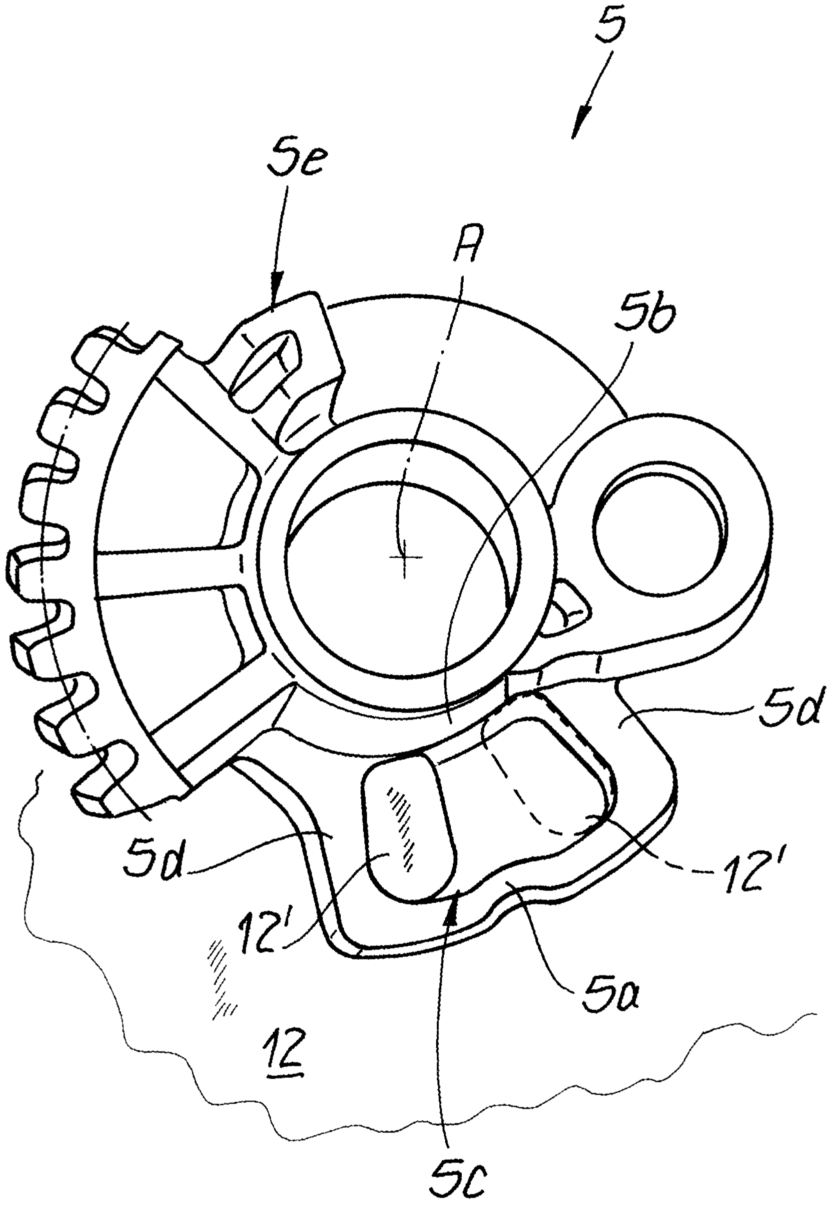
FIG. 3 shows the securing lever in a further detail.

FIG. 2 shows that the securing lever or first securing lever 5 and/or the anti-theft lever 5 in the exemplary embodiment, has a spring 5*a* for its positioning, which can also be understood in particular from the detailed representation according to FIG. 3. The spring 5*a* is made of the same material as the securing lever 5, because the securing lever 5 is made of a plastics material according to the exemplary embodiment—for example, it is designed as a plastic injection molded part. The securing lever 5 has a guide groove 5*c* into which a housing pin 12' engages. The housing pin 12' is molded onto a lock housing 12, which is also made of a plastics material.

The detail view in FIG. 3 shows that the guide groove 5*c* of the securing lever 5 has two end positions, and has an enlarged cross section in this region. These two end positions are shown in FIG. 3 by a solid and dashed illustration of the housing pin 12' plunging into the guide groove 5*c*.

In fact, the guide groove 5*c* is delimited in its longitudinal extension on the one hand by a stop wall 5*b*, and on the other hand by a spring wall 5*a*, as a spring 5*a*. The overall design is such that the stop wall 5*b* of the guide groove 5*c* is arranged radially inwards in relation to the axis of rotation A of the securing lever 5, while the spring wall 5*a* is arranged radially outwards in relation to the axis of rotation A. The stop wall 5*b* and the spring wall 5*a* are each formed in an arc shape with respect to the axis of rotation A.

The detail view of FIG. 3 also shows that the spring wall 5*a*, in the region of the two end positions of the securing lever 5, is made of material which is thicker in comparison to a connection region 5*d* connecting the two end positions to each other. The securing lever 5 also has a limit stop 5*e* for the emergency actuation element 9, 10, 11. In fact, the emergency actuation element 9, 10, 11 consists of an actuation nut or emergency actuation nut 9, and an emergency actuation lever 10. The emergency actuation lever 10 is pivotably connected to the actuating nut 9. In addition, the emergency actuation lever 10 has a pin 11, the end of which is connected to the emergency actuation lever 10 according to the exemplary embodiment. Rotational movements of the actuating nut 9 consequently result in the emergency actuation lever 10, and with it the pin 11 at the end, being moved back and forth linearly.

The pin 11, as part of the emergency actuation element 9, 10, 11, can interact overall with the limit stop 5*e* on the securing lever 5. In this way, rotary movements of the actuating nut 9 lead to the securing lever 5 being manually transferred at least into the end position, which corresponds to the "anti-theft device OFF" position. In this way, by means of the emergency actuation element 9, 10, 11, the anti-theft lever 5 in the exemplary embodiment can be moved to the "OFF" position, and consequently the external locking can be released. An associated motor vehicle door can then easily be opened from the outside even if the motor drive 7 has failed.

A comparison of FIGS. 1 and 2 makes it clear that the pin 11 at the end of the emergency actuation lever 10 passes through an opening 13 in the second securing lever or central locking lever 6. As a result, the emergency actuation element 9, 10, 11 can easily transfer the anti-theft lever or first securing lever 5 to the "OFF" position, regardless of the position of the second securing lever or central locking lever 6. As a result, the external locking is released as desired, and the associated motor vehicle door can be opened from the outside.

REFERENCE SIGNS

1 rotary latch
2 pawl
3 internal actuation lever
4 external actuation lever
5 anti-theft lever
5*a* spring wall
5*b* stop wall
5*c* guide groove
5*d* connection region
5*e* limit stop
6 central locking lever
7 anti-theft drive
8 central locking drive
9 actuating nut/emergency actuating nut
10 emergency actuation lever
11 pin
12 lock housing
12' housing pin
13 opening
A axis of rotation

The invention claimed is:

1. A motor vehicle latch comprising:
a locking mechanism having a catch and a pawl,
a securing device, and
an emergency actuation element for the securing device, the securing device having a first securing lever acted upon both by a motor drive and by an emergency actuation lever component of the emergency actuation element,
wherein the first securing lever has a guide groove formed in the first securing lever shaped for receiving a housing pin formed on a lock housing of the motor vehicle latch and a spring, wherein the quide groove moves with respect to the housing pin such that the first securing lever is positioned in any one of functional positions including "anti-theft device ON" and "anti-theft device OFF," and
the securing device further having a second securing lever, the first securing lever being designed as an anti-theft securing lever and the second securing lever being a central locking lever, the two securing levers being mounted on a same axis of rotation.

2. The motor vehicle latch according to claim 1, wherein the first securing lever and the spring are made of a same plastics material.

3. The motor vehicle latch according to claim 1, wherein the guide groove has an enlarged cross section in a region of each of two end positions of the first securing lever.

4. The motor vehicle latch according to claim 3, wherein the guide groove is delimited in its longitudinal extension on one side by a radially inner stop wall with respect to an axis of rotation of the securing lever and, on an opposing side, by a radially outer spring wall.

5. The motor vehicle latch according to claim 4, wherein the stop wall and the spring wall are each formed in a shape of a circular arc with respect to the axis of rotation.

6. The motor vehicle latch according to claim 4, wherein the spring wall, in a region of the two end positions of the securing lever, is reinforced with material thickening in comparison with a connection region between the two end positions.

7. The motor vehicle latch according to claim 1, wherein the first securing lever has a stop for the emergency actuation element.

8. The motor vehicle latch according to claim 7, wherein the stop interacts with a pin of the emergency actuation element.

9. The motor vehicle latch according to claim 8, wherein the pin passes through an opening in the second securing lever and is mounted coaxially with respect to the first securing lever.

10. The motor vehicle latch according to claim 7, wherein the pin is made of a plastics material.

11. The motor vehicle latch according to claim 1, wherein the motor vehicle latch includes a first motor drive that acts as an anti-theft drive by acting on the first securing lever, and a second motor drive that acts as a central locking drive by acting on the central locking lever.

12. The motor vehicle latch according to claim 1, wherein the emergency actuating element comprises an actuating nut, and the emergency actuating lever is pivotally connected to the actuating nut.

13. The motor vehicle latch according to claim 12, wherein the actuating nut is an external locking nut that permits externally releasing the lock.

14. The motor vehicle latch according to claim 12, wherein the emergency actuating element further comprises an actuating pin located at an end of the emergency actuating lever oppositely from the actuating nut.

15. A motor vehicle latch comprising:
a locking mechanism having a catch and a pawl,
a securing device, and
an emergency actuation element for the securing device, the securing device having a first securing lever acted upon both by a motor drive and by an emergency actuation lever component of the emergency actuation element,
wherein the first securing lever has a spring for being positioned in any one of functional positions including "anti-theft device ON" and "anti-theft device OFF," and
the securing device further having a second securing lever, the first securing lever being designed as an anti-theft securing lever and the second securing lever being a central locking lever, the two securing levers being mounted on a same axis of rotation,
wherein the first securing lever has a guide groove for a housing pin,
wherein the guide groove has an enlarged cross section in a region of each of two end positions of the first securing lever,
wherein the guide groove is delimited in its longitudinal extension on one side by a radially inner stop wall with respect to an axis of rotation of the securing lever and, on an opposing side, by a radially outer spring wall, and
wherein the spring wall, in a region of the two end positions of the securing lever, is reinforced with material thickening in comparison with a connection region between the two end positions.

16. A motor vehicle latch comprising:
a locking mechanism having a catch and a pawl,
a securing device, and
an emergency actuation element for the securing device, the securing device having a first securing lever acted upon both by a motor drive and by an emergency actuation lever component of the emergency actuation element,
wherein the first securing lever has a spring for being positioned in any one of functional positions including "anti-theft device ON" and "anti-theft device OFF," and
the securing device further having a second securing lever, the first securing lever being designed as an anti-theft securing lever and the second securing lever being a central locking lever, the two securing levers being mounted on a same axis of rotation,
wherein the emergency actuating element comprises an actuating nut, and the emergency actuating lever is pivotally connected to the actuating nut, and
wherein the emergency actuating element further comprises an actuating pin located at an end of the emergency actuating lever oppositely from the actuating nut.

* * * * *